(12) United States Patent
Baird et al.

(10) Patent No.: US 11,156,245 B2
(45) Date of Patent: Oct. 26, 2021

(54) HYBRID METALLIC/COMPOSITE AXIAL TENSION/COMPRESSION LOBE JOINT

(71) Applicant: GOODRICH CORPORATION, Charlotte, NC (US)

(72) Inventors: Brad Baird, Grimsby (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 964 days.

(21) Appl. No.: 15/864,780

(22) Filed: Jan. 8, 2018

(65) Prior Publication Data
US 2019/0211857 A1   Jul. 11, 2019

(51) Int. Cl.
| F16B 7/00 | (2006.01) |
| F16C 7/00 | (2006.01) |
| F16C 7/02 | (2006.01) |
| B29C 70/86 | (2006.01) |
| F16C 3/02 | (2006.01) |

(52) U.S. Cl.
CPC .............. *F16B 7/00* (2013.01); *B29C 70/865* (2013.01); *F16C 3/023* (2013.01); *F16C 7/00* (2013.01); *F16C 7/026* (2013.01); *F16C 2326/43* (2013.01)

(58) Field of Classification Search
CPC .. F16C 3/023; F16C 3/026; F16C 7/00; F16C 7/026; B29C 70/462; B29C 70/48; B29C 70/86
See application file for complete search history.

(56) References Cited

U.S. PATENT DOCUMENTS

| 4,236,386 | A | * | 12/1980 | Yates | B29C 70/86 |
| | | | | | 138/109 |
| 4,380,443 | A | * | 4/1983 | Federmann | F16C 3/023 |
| | | | | | 464/181 |
| 4,421,497 | A | * | 12/1983 | Federmann | F16D 3/387 |
| | | | | | 464/181 |
| 7,335,108 | B2 | * | 2/2008 | Lin | B29C 70/462 |
| | | | | | 464/181 |
| 8,414,724 | B2 | | 4/2013 | Schnelz | |
| 9,441,374 | B2 | | 9/2016 | Ganis | |
| 9,568,040 | B2 | | 2/2017 | Ganis | |
| 9,726,325 | B2 | | 8/2017 | Ganis et al. | |
| 2002/0041790 | A1 | * | 4/2002 | Suzuki | F16D 3/387 |
| | | | | | 403/280 |
| 2002/0195291 | A1 | * | 12/2002 | Nonogaki | F16D 3/387 |
| | | | | | 180/337 |

(Continued)

FOREIGN PATENT DOCUMENTS

| EP | 3054179 | 8/2016 |
| WO | 2009003207 | 1/2009 |

(Continued)

OTHER PUBLICATIONS

European Patent Office, European Search Report dated Jun. 12, 2019 in Application No. 19150569.2.

*Primary Examiner* — Daniel J Wiley
(74) *Attorney, Agent, or Firm* — Snell & Wilmer L.L.P.

(57) ABSTRACT

A composite tube joint may comprise an end of a composite tube, an attachment feature comprising a first portion disposed within the end and a second portion extending from the end, wherein the first portion comprises a protuberant surface, and the protuberant surface mitigates movement of the attachment feature relative to the composite tube.

17 Claims, 4 Drawing Sheets

(56) References Cited

U.S. PATENT DOCUMENTS

| | | | | |
|---|---|---|---|---|
| 2005/0254890 A1* | 11/2005 | Schulz | ................... | F16D 1/072 |
| | | | | 403/359.1 |
| 2008/0119296 A1* | 5/2008 | Kennedy | ............... | B29C 53/562 |
| | | | | 464/181 |
| 2014/0141894 A1* | 5/2014 | Freund | ..................... | F01D 5/06 |
| | | | | 464/181 |
| 2017/0191520 A1* | 7/2017 | Larson | ................... | F16D 1/033 |

FOREIGN PATENT DOCUMENTS

| | | |
|---|---|---|
| WO | 2009153220 | 12/2009 |
| WO | 2013066727 | 5/2013 |

\* cited by examiner

HYBRID METALLIC/COMPOSITE AXIAL TENSION/COMPRESSION LOBE JOINT

FIELD

The present disclosure relates generally to joints, and more specifically to joints having composite components.

BACKGROUND

Conventional structural components, for example aircraft landing gear components, are typically made of metallic materials. These metallic components can be relatively heavy and costly. Substitution of metals with composites is one way to reduce the weight and cost of structural components. Among other challenges is implementation of strong joints for load transfer from composite elements to metallic parts. The composite elements are typically fabricated in the form of tubes and are capable of handling significant axial and bending loads under both tension and compression.

SUMMARY

A composite tube joint is disclosed, comprising an end of a composite tube, an attachment feature comprising a first portion disposed within the end and a second portion extending from the end, wherein the first portion comprises a protuberant surface, the protuberant surface mitigates movement of the attachment feature relative to the composite tube, the protuberant surface comprises a maximum diameter location and decreases in diameter along a first axial direction from the maximum diameter location, the protuberant surface decreases in diameter along a second axial direction from the maximum diameter location, and the first axial direction is opposite from the second axial direction.

In various embodiments, the end extends along a centerline axis.

In various embodiments, the end surrounds the protuberant surface.

In various embodiments, the protuberant surface comprises a convex geometry.

In various embodiments, an inner diameter (ID) surface of the end conforms to the protuberant surface.

In various embodiments, the protuberant surface mechanically locks the end onto the attachment feature.

In various embodiments, the attachment feature comprises a metallic material.

In various embodiments, the protuberant surface and the end are in concentric alignment with the centerline axis.

A composite tube joint is disclosed, comprising an end of a composite tube, an attachment feature comprising a first portion disposed within the end and a second portion extending from the end, a first lobe circumferentially surrounding a first half of the first portion, and a second lobe circumferentially surrounding a second half of the first portion.

In various embodiments, the composite tube joint further comprises a protuberant surface defining at least a portion of the first lobe and at least a portion of the second lobe, wherein the protuberant surface mitigates movement of the attachment feature relative to the composite tube.

In various embodiments, the composite tube joint further comprises a first flange disposed in the first portion, a second flange disposed in the first portion, and a groove disposed in the first portion between the first flange and the second flange.

In various embodiments, the first lobe is disposed in the groove and the second lobe is disposed in the groove.

In various embodiments, the first flange and the second flange mitigate axial movement of the first lobe and the second lobe relative to the attachment feature.

In various embodiments, the protuberant surface defines an outer diameter (OD) surface of the first lobe and the second lobe, and the protuberant surface mitigates axial movement of the end relative to the attachment feature.

In various embodiments, the protuberant surface comprises a maximum diameter location, the protuberant surface decreases in diameter along a first axial direction from the maximum diameter location, the protuberant surface decreases in diameter along a second axial direction from the maximum diameter location, and the first axial direction is opposite from the second axial direction.

In various embodiments, an inner diameter (ID) surface of the end conforms to the protuberant surface.

In various embodiments, the protuberant surface mechanically locks the end onto the attachment feature.

In various embodiments, the attachment feature comprises a metallic material.

In various embodiments, the protuberant surface and the end are in concentric alignment.

A method for forming a composite tube joint is disclosed, comprising disposing a first lobe to surround a first half of a first portion of an attachment feature, disposing a second lobe to surround a second half of the first portion of the attachment feature, wherein the first lobe and the second lobe define a protuberant surface, and disposing a composite layer to surround the first lobe and the second lobe, wherein the composite layer takes on a geometry of the protuberant surface, thereby mechanically locking the attachment feature within the composite layer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes composite components having at least one end of a composite tube and at least one composite tube joint formed thereon. The composite tube joint may include an end of the composite tube, an inner member, and an outer member. The inner member and the outer member may be made from a material including, but not limited to, metals, composites, ceramics, wood, polymers, and glass. A composite may comprise a polymer matrix composite. The composite may comprise a polymer matrix composite reinforced by fibers such as a carbon, glass, organic fibers, or combinations thereof. Such composite tube joints may be used in aircraft systems, such as, for example, landing gear systems. However, the systems and methods of the present disclosure may be suitable for use in non-aircraft systems as well.

A composite tube joint of the present disclosure may include an end of a composite tube, an inner member, and an outer member. A composite tube joint may experience bending loads. Composite tube joints having undulated surfaces, of the present disclosure, may mitigate slipping of the composite tube with respect to an inner member and/or an outer member of the composite tube joint.

In various embodiments, a composite tube joint of the present disclosure may be useful for various components including, but not limited to, linkages, connecting rods, actuator rods, struts, structural supports, etc.

Figure 1:
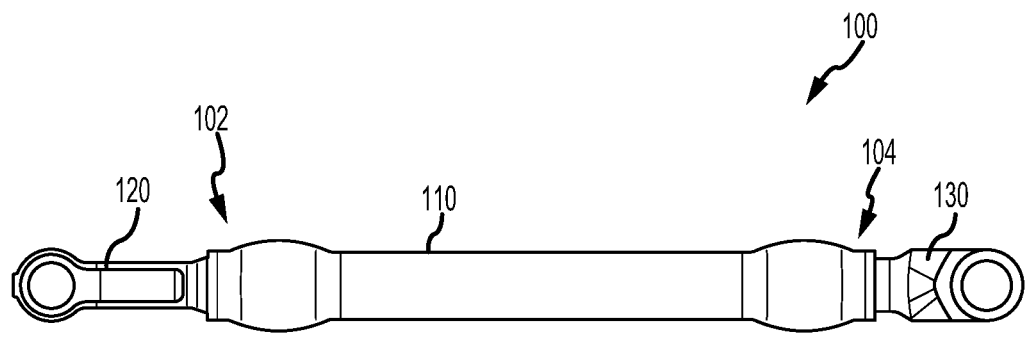
FIG. 1 illustrates a composite component comprising a composite tube having joints at the ends thereof, in accordance with various embodiments.

With reference to FIG. 1, a perspective view of a structural component 100 is illustrated, in accordance with various embodiments. Structural component 100 may comprise a composite tube (also referred to herein as a composite layer) 110 and an attachment feature (also referred to herein as a first attachment feature) 120. Structural component 100 may further comprise an attachment feature (also referred to herein as a second attachment feature) 130. Attachment feature 120 may be configured to couple composite tube 110 to an adjacent component. Attachment feature 130 may be configured to couple composite tube 110 to an adjacent component. Attachment feature 120 may comprise a lug. Attachment feature 130 may comprise a clevis. However, it is contemplated herein that attachment feature 120 and attachment feature 130 may comprise any suitable attachment feature, including a lug, a clevis, a rod, or the like. In various embodiments, attachment feature 120 and/or attachment feature 130 may be made from a metallic material.

Attachment feature 120 and composite tube 110 may form a composite tube joint 102. In this regard, composite tube joint 102 may comprise attachment feature 120 and an end 106 of composite tube 110. Composite tube joint 102 may be configured to couple composite tube 110 to attachment feature 120. Composite tube joint 102 may be configured to transfer loads (e.g., axial loads and/or bending loads) between composite tube 110 and attachment feature 120.

Attachment feature 130 and composite tube 110 may form a composite tube joint 104. In this regard, composite tube joint 104 may comprise attachment feature 130 and an end 108 of composite tube 110. Composite tube joint 104 may be configured to couple composite tube 110 to attachment feature 130. Composite tube joint 104 may be configured to transfer loads (e.g., axial loads and/or bending loads) between composite tube 110 and attachment feature 130.

Figure 2A:
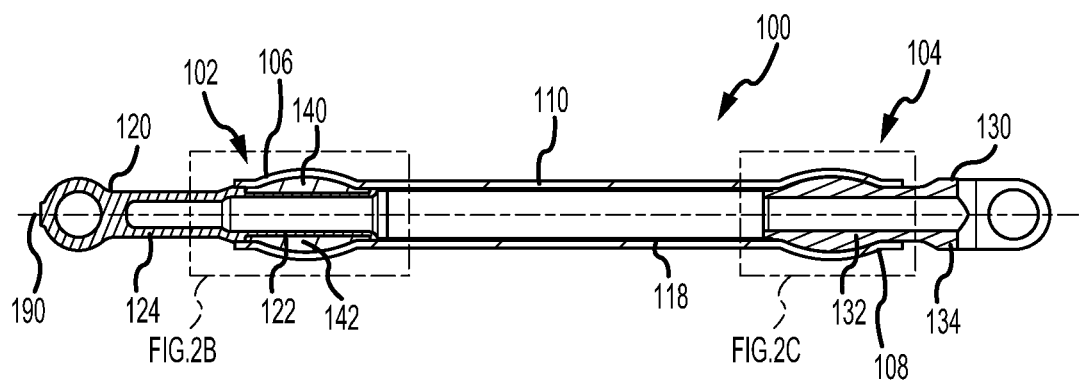
FIG. 2A illustrates a cross-sectional view of the composite component of FIG. 1, in accordance with various embodiments.

With reference to FIG. 2A, a cross-section view of structural component 100 is illustrated, in accordance with various embodiments. Composite tube joint 102 may further include a first insert (also referred herein as a first lobe) 140 and a second insert (also referred to herein as a second lobe) 142. The geometry of first lobe 140 and second lobe 142 may be configured to provide a mechanical lock to mitigate movement of composite tube 110 relative to attachment feature 120 along the axial direction (i.e., along centerline axis 190).

In various embodiments, a first portion 122 of attachment feature 120 may be located within composite tube 110 and a second portion 124 of attachment feature 120 may extend from composite tube 110. Similarly, a first portion 132 of attachment feature 130 may be located within composite tube 110 and a second portion 134 of attachment feature 130 may extend from composite tube 110.

A liner 118 may extend between attachment feature 120 and attachment feature 130. Liner 118 may comprise a tube. An end of liner 118 may surround a portion of first attachment feature 120 and an opposite end of liner 118 may surround a portion of second attachment feature 130. Liner 118 may provide a surface onto which composite tube 110 may be formed, during a composite layup process for example. For example, in various embodiments, composite tube 110 may be formed by laying composite sheets or layers in a desired shape and bonding the layers together using resins, adhesives, or other bonding agents. In various embodiments, composite tube 110 may be formed using a fiber-wound fabrication process, wherein fiber is continuously wound onto liner 118 and bonded together using resins, adhesives, or other bonding agents.

Figure 2B:
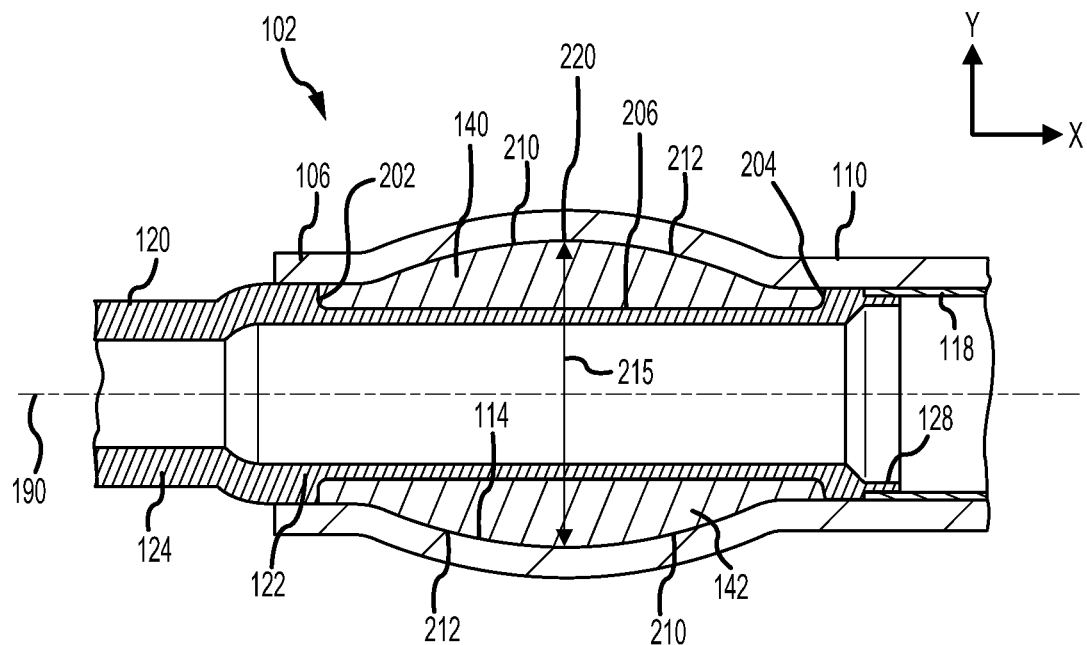
FIG. 2B illustrates an enlarged view of a composite tube joint of FIG. 2A, in accordance with various embodiments.

With reference to FIG. 2B, an enlarged view of composite tube joint 102 is illustrated, in accordance with various embodiments. Attachment feature 120 may comprise a flange 128 extending into liner 118. Attachment feature 120 may comprise a first flange 202. First flange 202 may be disposed in first portion 122 of attachment feature 120. Attachment feature 120 may comprise a second flange 204. Second flange 204 may be disposed in first portion 122 of attachment feature 120. Attachment feature 120 may comprise a groove 206 disposed in first portion 122 between first flange 202 and second flange 204. First lobe 140 may be disposed in groove 206. Stated differently, first lobe 140 may be disposed between first flange 202 and second flange 204. Second lobe 142 may be disposed in groove 206. Stated differently, second lobe 142 may be disposed between first flange 202 and second flange 204. First flange 202 and second flange 204 may mitigate axial movement of first lobe 140 and second lobe 142 relative to attachment feature 120.

In various embodiments, first lobe 140 and second lobe 142 may define a protuberant surface 210. Protuberant surface 210 may mitigate axial movement of attachment feature 120 relative to composite tube 110. Protuberant surface 210 may define an OD surface 212 of first lobe 140 and second lobe 142. Protuberant surface 210 may mitigate axial movement of end 106 of composite tube 110 relative to attachment feature 120.

In various embodiments, protuberant surface 210 may comprise a maximum diameter location 220. Protuberant surface 210 may decrease in diameter 215 along a first axial direction (e.g., the negative X-direction) from maximum diameter location 220. Protuberant surface 210 may decrease in diameter 215 along a second axial direction (e.g., the positive X-direction) from maximum diameter location 220. The first axial direction may be opposite from the second axial direction (i.e., negative X-direction is in the opposite direction of the position X-direction). In this regard, protuberant surface 210 may be tapered in either axial direction from maximum diameter location 220. Protuberant surface 210 may comprise a convex geometry. Composite tube 110 may comprise an inner diameter (ID) surface 114. ID surface 114 may conform to protuberant surface 210. Stated differently, the geometry of ID surface 114, at end 106 of composite tube 110, may be complementary to the geometry of protuberant surface 210. In this regard, protuberant surface 210 may mechanically lock end 106 onto attachment feature 120. In various embodiments, protuberant surface 210 and end 106 may be in concentric alignment with centerline axis 190.

In various embodiments, attachment feature 120 may comprise a first material and first lobe 140 and second lobe 142 may comprise a second material. The second material may be a lightweight material. For example, attachment feature may comprise steel and first lobe 140 and second lobe 142 may comprise aluminum. However, attachment feature 120, first lobe 140, and second lobe 142 may comprise any suitable material. In this regard, providing attachment feature 120, first lobe 140, and second lobe 142 as separate pieces, may allow for first lobe 140 and second lobe 142 to comprise a material having a lighter weight than attachment feature 120, thus reducing the weight of composite tube joint 102, while maintaining sufficient strength for withstanding structural loading.

Figure 2C:
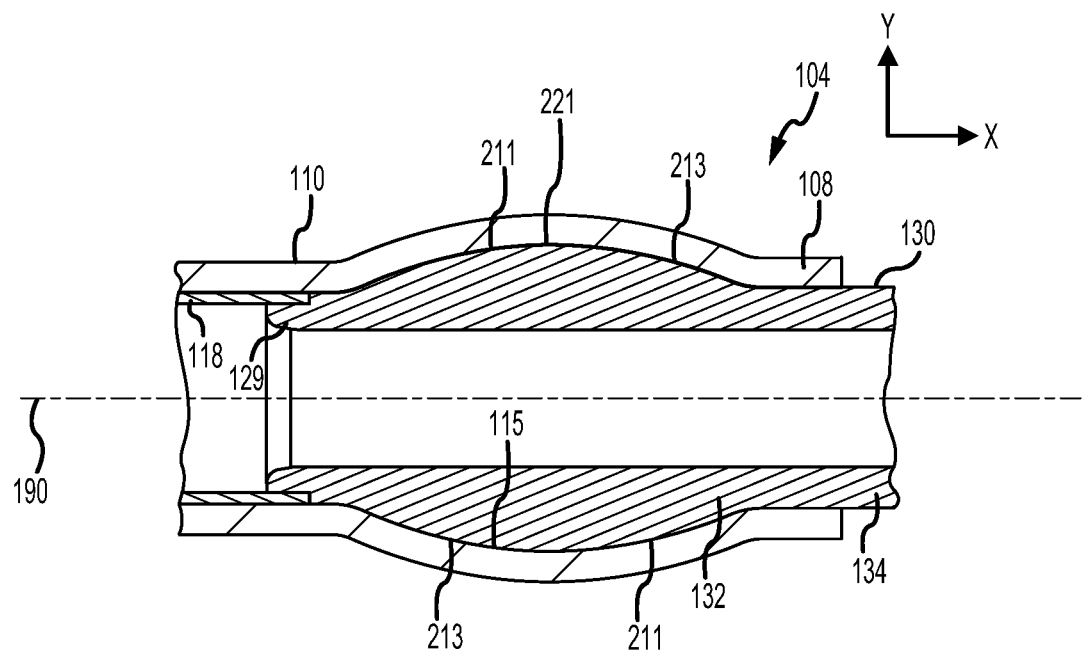
FIG. 2C illustrates an enlarged view of a composite tube joint of FIG. 2A, in accordance with various embodiments.

With reference to FIG. 2C, an enlarged view of composite tube joint 104 is illustrated, in accordance with various embodiments. Attachment feature 130 may comprise a flange 129 extending into liner 118. In various embodiments, first portion 132 may define a protuberant surface 211. Protuberant surface 211 may mitigate axial movement attachment feature 130 relative to composite tube 110. Protuberant surface 211 may define an OD surface 213 of first portion 132 of attachment feature 130. Protuberant surface 211 may mitigate axial movement of end 108 of composite tube 110 relative to attachment feature 130.

In various embodiments, protuberant surface 211 may comprise a maximum diameter location 221. The diameter of protuberant surface 211 may decrease along a first axial direction (e.g., the negative X-direction) from maximum diameter location 221. The diameter of protuberant surface 211 may decrease along a second axial direction (e.g., the positive X-direction) from maximum diameter location 221. Composite tube 110 may comprise an ID surface 115. ID surface 115 may conform to protuberant surface 211. Stated differently, the geometry of ID surface 115, at end 108 of composite tube 110, may be complementary to the geometry of protuberant surface 211. In this regard, protuberant surface 211 may mechanically lock end 108 onto attachment feature 130. For example, end 108 may comprise a smaller diameter than the maximum diameter of protuberant surface 211, thereby preventing end 108 from slipping axially (e.g., in the positive X-direction) over protuberant surface 211. In various embodiments, protuberant surface 211 and end 108 may be in concentric alignment with centerline axis 190.

Figure 3:
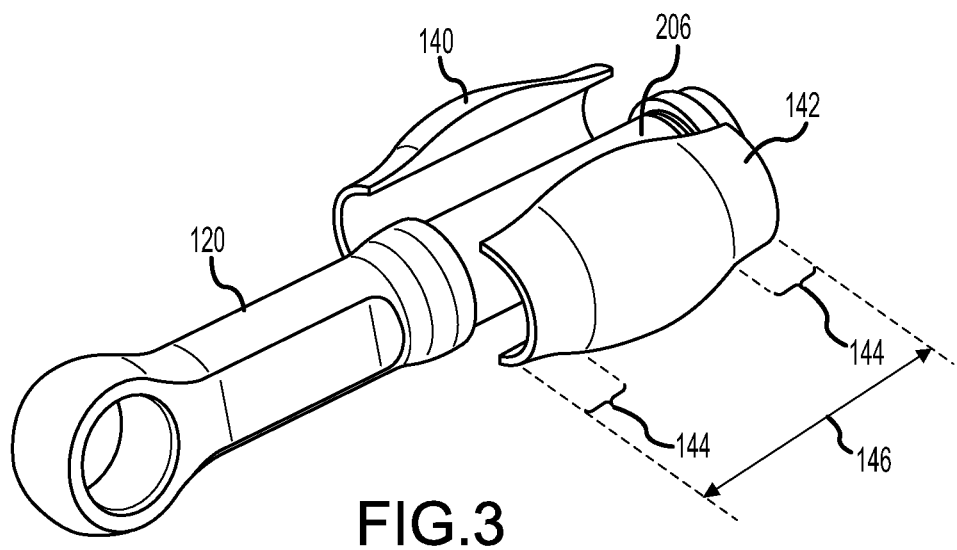
FIG. 3 illustrates an isometric view of the attachment feature of FIG. 2B, in accordance with various embodiments.

With reference to FIG. 3, an isometric view of first lobe 140 and second lobe 142 being installed onto attachment feature 120 is illustrated, in accordance with various embodiments. In various embodiments, first lobe 140 and second lobe 142 may comprise axial extensions to aid in transferring bending loads between first lobe 140 and second lobe 142 and attachment feature 120. For example, second lobe 142 may comprise axial extensions 144. First lobe 140 may similarly comprise axial extensions. In various embodiments, the total axial length 146 of second lobe 142 may be greater than the maximum diameter 215 of second lobe 142, with momentary reference to FIG. 2B. The total axial length of first lobe 140 may be similar to total axial length 146.

Figure 4:
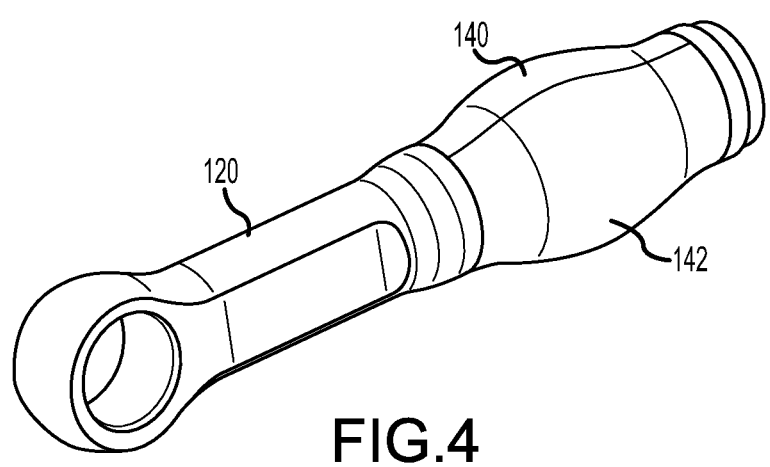
FIG. 4 illustrates an isometric view of the attachment feature of FIG. 2B with the lobes in the installed position, in accordance with various embodiments.

With reference to FIG. 4, an isometric view of first lobe 140 and second lobe 142 in an installed position on attachment feature 120 is illustrated, in accordance with various embodiments.

Figure 5:
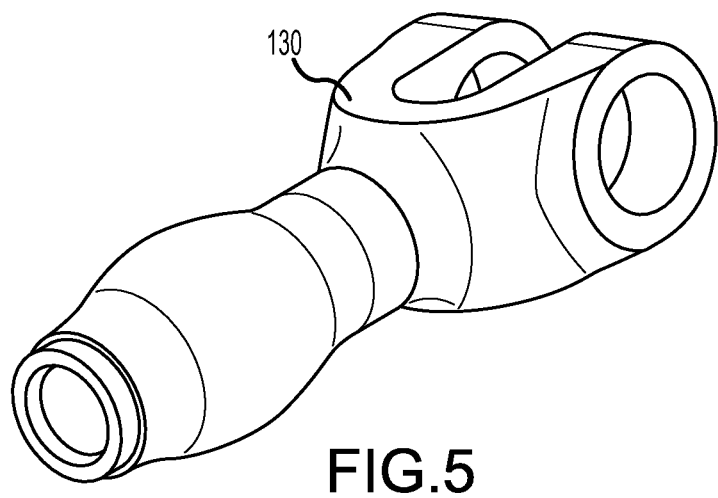
FIG. 5 illustrates an isometric view of the attachment feature of FIG. 2C, in accordance with various embodiments.

With reference to FIG. 5, an isometric view of attachment feature 130 is illustrated, in accordance with various embodiments.

Figure 6:
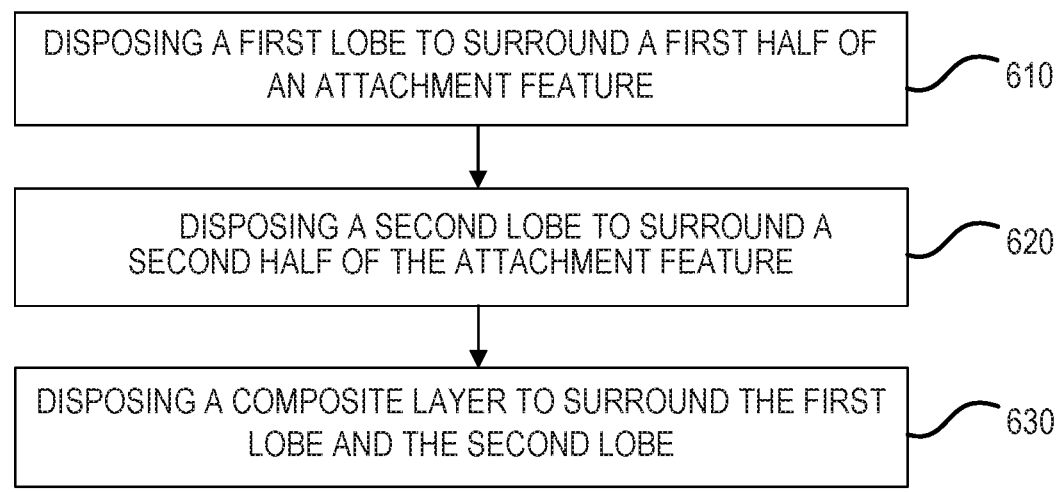
FIG. 6 provide a method for forming a composite tube joint, in accordance with various embodiments.

With reference to FIG. 6, a method 600 for forming a composite tube joint is provided, in accordance with various embodiments. Method 600 includes disposing a first lobe to surround a first half of an attachment feature (step 610). Method 600 includes disposing a second lobe to surround a second half of the attachment feature (step 620). Method 600 includes disposing a composite layer to surround the first lobe and the second lobe (step 630).

With combined reference to FIG. 2B and FIG. 6, step 610 may include disposing first lobe 140 to surround a first half (e.g., the portion of attachment feature 120 disposed above (positive Y-direction) centerline axis 190) of first portion 122 of attachment feature 120. Step 620 may include disposing second lobe 142 to surround a second half (e.g., the portion of attachment feature 120 disposed below (negative Y-direction) centerline axis 190) of first portion 122 of attachment feature 120. Step 630 may include disposing composite tube 110 to surround first lobe 140 and second lobe 142. Step 630 may further include curing composite tube 110 such that composite tube 110 becomes rigid.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube joint, comprising:
an end of a composite tube;
an attachment feature comprising a first portion disposed within the end and a second portion extending from the end,
a first lobe circumferentially surrounding a first half of the first portion;
a second lobe circumferentially surrounding a second half of the first portion;
a first flange disposed in the first portion;
a second flange disposed in the first portion; and
a groove disposed in the first portion between the first flange and the second flange.

2. The composite tube joint of claim 1, further comprising a protuberant surface defining at least a portion of the first lobe and at least a portion of the second lobe,
wherein the protuberant surface mitigates movement of the attachment feature relative to the composite tube.

3. The composite tube joint of claim 2, wherein the protuberant surface defines an outer diameter (OD) surface of the first lobe and the second lobe, and the protuberant surface mitigates axial movement of the end relative to the attachment feature.

4. The composite tube joint of claim 2, wherein the protuberant surface comprises a maximum diameter location;
the protuberant surface decreases in diameter along a first axial direction from the maximum diameter location;
the protuberant surface decreases in diameter along a second axial direction from the maximum diameter location; and
the first axial direction is opposite from the second axial direction.

5. The composite tube joint of claim 2, wherein an inner diameter (ID) surface of the end conforms to the protuberant surface.

6. The composite tube joint of claim 2, wherein the protuberant surface mechanically locks the end onto the attachment feature.

7. The composite tube joint of claim 2, wherein the protuberant surface and the end are in concentric alignment.

8. The composite tube joint of claim 1, wherein the first lobe is disposed in the groove and the second lobe is disposed in the groove.

9. The composite tube joint of claim 8, wherein the first flange and the second flange mitigate axial movement of the first lobe and the second lobe relative to the attachment feature.

10. The composite tube joint of claim 1, wherein the attachment feature comprises a metallic material.

11. A method for forming a composite tube joint, comprising:
disposing a first lobe to surround a first half of a first portion of an attachment feature;
disposing a second lobe to surround a second half of the first portion of the attachment feature,
wherein the first lobe and the second lobe define a protuberant surface; and
disposing a composite layer to surround the first lobe and the second lobe, wherein the composite layer takes on a geometry of the protuberant surface, thereby mechanically locking the attachment feature within the composite layer.

12. A composite tube joint, comprising:
an end of a composite tube;
an attachment feature comprising a first portion disposed within the end and a second portion extending from the end,
a first lobe circumferentially surrounding a first half of the first portion;
a second lobe circumferentially surrounding a second half of the first portion;
a protuberant surface defining at least a portion of the first lobe and at least a portion of the second lobe,
wherein an inner diameter (ID) surface of the end of the composite tube conforms to the protuberant surface.

13. The composite tube joint of claim 12, wherein the protuberant surface mitigates movement of the attachment feature relative to the composite tube.

14. The composite tube joint of claim 12, wherein the protuberant surface defines an outer diameter (OD) surface of the first lobe and the second lobe.

15. The composite tube joint of claim 14, wherein the protuberant surface mitigates axial movement of the end relative to the attachment feature.

16. The composite tube joint of claim 12, wherein the protuberant surface comprises a maximum diameter location;

the protuberant surface decreases in diameter along a first axial direction from the maximum diameter location;

the protuberant surface decreases in diameter along a second axial direction from the maximum diameter location; and the first axial direction is opposite from the second axial direction.

17. The composite tube joint of claim 12, wherein the protuberant surface mechanically locks the end onto the attachment feature.

\* \* \* \* \*